Dec. 17, 1968 E. T. MOORE 3,417,348

FREQUENCY CONTROL FOR MAGNETICALLY COUPLED OSCILLATORS

Filed April 5, 1967 2 Sheets-Sheet 1

INVENTOR.
Edward T. Moore

BY B. B. Olive

ATTORNEY

*INVENTOR.*
Edward T. Moore

*BY* B. B. Olive

ATTORNEY

3,417,348
FREQUENCY CONTROL FOR MAGNETICALLY COUPLED OSCILLATORS

Edward T. Moore, Durham, N.C., assignor to Wilmore Electronics Company, Inc., Durham, N.C., a corporation of North Carolina Filed Apr. 5, 1967, Ser. No. 628,626
2 Claims. (Cl. 331—113)

ABSTRACT OF THE DISCLOSURE

Frequency control of a magnetically coupled oscillator is obtained by utilizing two magnetic paths within a saturable frequency determining element, encircling both of the paths with a control winding configuration and applying a DC voltage across the control winding. The rate of switching and thus the oscillator frequency is determined by the value of the applied voltage.

BACKGROUND OF THE INVENTION

*Field of the invention.*—The invention is related broadly to frequency control of magnetically-coupled oscillators having a cyclically-saturating square-loop element as the frequency-determining means. Magnetically-coupled switching-transistor multivibrators and other types of square-loop-core switching-transistor inverters may employ the invention as a means of frequency control. Shelf-oscillating inverters are used, for example, in motor-speed controls, telemetry, power regulators and various consumer products.

*Description of the prior art.*—Use of magnetically-coupled multivibrators has become widespread because of their simplicity, ruggedness, reliability, low cost and power-handling capability. However, those in the art have recognized that a low-cost and simple means of frequency control, if available, would greatly extend the use of self-oscillating inverters. See, for example, AIEE Transactions, pt. I, vol. 74, pp. 322–326 by Royer (referred to later as Reference 1) and pp. 356–361 by Van Allen, July 1955 (Reference 2).

Prior to the present invention, frequency-control circuitry for self-oscillating inverters has tended to be directed toward special purpose applications and has generally been relatively complex. See, for example, Reference 2 cited above and the further literature references IEEE Transactions, pt. I, vol. 83, pp. 421–428, by Wilson and Moore, July 1964 (Reference 3); IEEE Transactions on Space Electronics and Telemetry, vol. SET–9, pp. 12–18, by Paul, March 1963 (Reference 4); IEEE Transactions, pt. I, vol. 83, pp. 288–294, by Sterling, Moore and Wilson, May 1964 (Reference 5) and IRE Transactions (Circuit Theory), vol. CT–4, pp. 276–279, by Jensen, September 1957 (Reference 6).

SUMMARY OF THE INVENTION

According to the invention, a magnetically-coupled oscillator utilizes two rather than a single magnetic path within the frequency determining element. Both paths are encircled by an appropriate winding configuration forming part of the conventional oscillator and switching circuitry. A practical way of establishing the two paths is to use two cores and the cores would normally be of substantially identical saturable characteristic. In the absence of the control circuitry of the invention, both paths operate as a single path and saturate together to effect switching. For purposes of the invention both paths are encircled by a supplementary control winding and across the terminals of this winding there is applied a DC control voltage. In one embodiment the control winding has a portion encircling one of the paths with a given polarity and another portion encircling the other of the paths with an opposing polarity. Under the influence of the control winding and with the control voltage set at some value greater than zero volts the frequency of oscillation will be determined by the value of the control voltage. On one half cycle of operation one path will saturate and will cause switching to take place whereas on the following half cycle of operation, the other of the paths will saturate and will cause switching. The rate of switching and thus the frequency of oscillation is determined by the particular value of control voltage which is applied across the control winding. Of particular interest is the fact that the invention is applicable to many and various forms of magnetically coupled oscillators. The invention generally requires no basic alteration of conventional oscillator circuitry since the invention requires only the substitution of two magnetic paths for the saturable magnetic path which would otherwise be employed within the frequency-determining magnetic element, the use of a supplementary control winding and the employment of a control voltage.

An object of the invention is to provide a simple and low-cost frequency control for magnetically-coupled oscillators.

Another object is to provide a frequency control which has essentially universal application to conventional magnetically-coupled oscillator circuits with a minimum of additional complexity.

DESCRIPTION OF THE PREFERRED EMBODIMENTS

Figure 1:
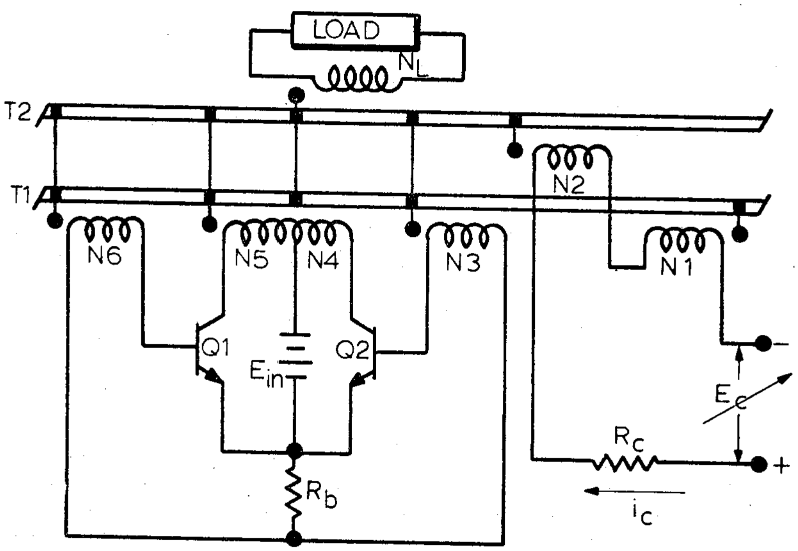
FIGURE 1 shows the invention circuitry applied to a magnetically-coupled multivibrator with voltage feedback.

FIGURE 1 shows the invention employed in a type of voltage feedback magnetically-coupled multivibrator circuit which is, perhaps, the best known and most widely used single configuration of this general class of inverters. It is often referred to in the art as the "Royer circuit." Windings $N_3$, $N_4$, $N_5$, $N_6$ and the load winding $N_L$ of the circuit of FIGURE 1 are windings normally found on a conventional voltage-feedback saturable-core inverter of this type and serve the same purposes in this circuit as they do in the conventional circuit described in Reference 1. The circuit of FIGURE 1 differs, however, from a conventional voltage-feedback inverter in that these windings encircle, not one, but two magnetic paths established by saturable cores $T_1$ and $T_2$. Cores $T_1$ and $T_2$ are normally identical, square-loop cores and each contains a control winding $N_1$, $N_2$. Control windings $N_1$, $N_2$ are connected in series, with opposing polarities as shown. In the drawings, the polarity is indicated by the dots shown and the lines extending from the dots indicate which cores the windinngs encircle. For example, winding $N_1$ encircles only core $T_1$ whereas winding $N_3$ encircles both core $T_1$ and core $T_2$.

A direct current control voltage labelled $E_c$ in FIGURE 1 is applied across the control windings $N_1$, $N_2$. If the value of control voltage $E_c$ is zero, the rates of flux change in cores $T_1$, $T_2$ will always be exactly equal and the inverter of FIGURE 1 will operate as if windings $N_3$, $N_4$, $N_5$, $N_6$ and $N_L$ encircled one saturable core having a flux capacity equal to the combined flux capacity of cores $T_1$ and $T_2$. Under this condition, the circuit will operate exactly as described by Royer in Reference 1, with the frequency of oscillation being essentially proportional to the value of the input voltage labelled $E_{in}$. If, however, the DC control voltage $E_c$ is increased from zero to some predetermined value, the frequency will be increased and it will be found that the increase in frequency is, to a close approximation, proportional to the increase in the control voltage $E_c$.

The reasons for the effect of the control voltage $E_c$ on the frequency can best be examined by following the operation of the inverter through one full cycle. Assume that the DC control voltage $E_c$ is set to some small but non-zero value, that transistor $Q_1$ has just been turned on, and that the flux level in cores $T_1$ and $T_2$ has just started to move to the left after both cores have been saturated to the right. Because of the small control voltage $E_c$, the rates of flux change in the two magnetic paths, i.e. the two cores, will be different. Assuming ideal magnetic characteristics for cores $T_1$ and $T_2$, i.e. assuming that their magnetizing current is zero when unsaturated, and assuming no collector-to-emitter voltage drop across transistor $Q_1$ when it is turned on, the rates of flux change in the two cores can be written:

$$\frac{d\phi_1}{dt}=\frac{E_{in}}{2N_5}+\frac{E_c}{2N_c}$$

$$\frac{d\phi_2}{dt}=\frac{E_{in}}{2N_5}-\frac{E_c}{2N_c}$$

where $\phi_1$ is the flux in core $T_1$, $\phi_2$ is the flux in core $T_2$, and $N_c=N_1=N_2$.

Thus, because of the control voltage $E_c$, the flux in core $T_1$ changes at a faster rate during the conducting interval of transistor $Q_1$ than does the flux in core $T_2$. When core $T_1$ reaches saturation to the left, core $T_2$ will, therefore, still be unsaturated. Saturation of core $T_1$ implies that the total $d\phi/dt$ which must take place within winding $N_5$ to support the voltage $E_{in}$ will tend to take place within core $T_2$. This in turn implies that, at the same time the voltage in control winding $N_1$ drops to zero, the voltage in control winding $N_2$ tends to increase significantly. This cannot happen, however, since as soon as one core saturates and the control winding voltages cease to cancel, a large pulse of control-circuit current flows. This current pulse is reflected to the primary winding $N_5$ of the inverter and causes transistor $Q_1$ to become unsaturated, and switching, i.e. reversal of the states of transistor $Q_1$ and transistor $Q_2$, is thereby caused to occur. The shape, amplitude and duration of the current pulse which flows in the control winding during this transient switching interval are determined to a large degree by the squareness of the cores and the transistor characteristics in the same manner as in conventional saturable-core inverters.

Thus, the half cycle during which transistor $Q_1$ conducts ends with core $T_1$ saturated and core $T_2$ near the left end of its loop but not quite to the saturation level. When transistor $Q_2$ turns on and the fluxes in the two cores begin to move to the right, the effect of the control voltage $E_c$ will be to cause the rate of flux change in $T_2$ to be greater than the rate of change in $T_1$. At the end of this half cycle, core $T_2$, which starts this half cycle with a headstart toward saturation to the right and in which the flux is changing more rapidly than in $T_1$, will saturate and transistor switching will again occur.

From the foregoing description of one full cycle of inverter operation, it is apparent that an increase in $E_c$ will cause an increase in the frequency of oscillation, but the reason why the inverter frequency reaches a steady-state value corresponding to a given value of control voltage $E_c$ is not readily apparent. That is, if when $Q_1$ is conducting the flux in core $T_1$ always changes faster than the flux in $T_2$ and when $Q_2$ is conducting the flux in core $T_2$ always changes faster than the flux in $T_1$, then it would appear that any non-zero setting of the control voltage $E_c$, no matter how small, would finally cause core $T_1$ to be saturated to the right at the same time core $T_2$ was saturated to the left such that the half-cycle period of the inverter would approach zero. Briefly stated, the reason that this does not happen is that, when one of the cores begins to saturate at the end of a half cycle, a pulse of current flows in the control circuit as described previously. The control circuit contains some resistance, labelled $R_c$ in FIGURE 1, at least the resistance of the control windings, and the current pulse causes a voltage drop to appear across this resistance in a direction which opposes the control voltage. Thus, each such current pulse in the control winding has the effect of a negative feedback signal, and the average value of this negative feedback signal is proportional to the number of these pulses which occur per unit time, i.e. to the frequency of the inverter. When a given control voltage $E_c$ is applied to the control circuit, the frequency of the inverter simply increases until the average value of this negative feedback signal is sufficient to prevent a further increase in frequency.

Figure 3:
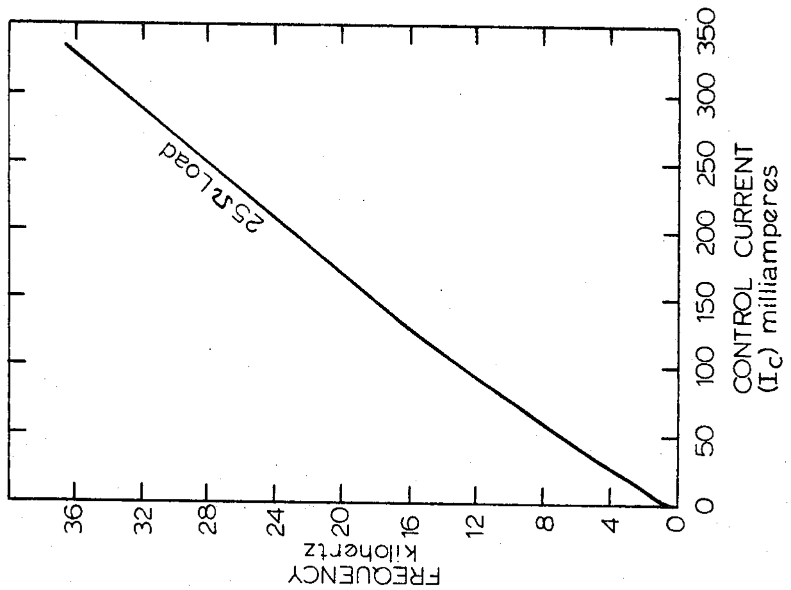
FIGURE 3 shows a plot of frequency versus control current for the FIGURE 1 circuit.

FIGURE 3 shows typical frequency-control characteristics for the voltage-feedback inverter circuit of FIGURE 1. This characteristic was obtained from the test circuit with the following component values:

$T_1$, $T_2$—
- Core—51026–2A Magnetics, Inc., Butler, Pa.
- $N_1$, $N_2$—100 turns #30 AWG.
- $N_3$, $N_6$—11 turns #30 AWG.
- $N_4$, $N_5$—82 turns #24 AWG.
- $N_L$—45 turns #20 AWG.

$R_b$—33 ohms.
$R_c$—4.2 ohms (3.2 ohms winding resistance, 1 ohm external).
$Q_1$, $Q_2$—type 2N3053 transistors.
$E_{in}$—15 volts DC.

The excellent linearity of the frequency vs. the control MMF is interesting to note. Although FIGURE 3 shows only the variation of frequency with one polarity of control current, the frequency increases in a symmetrical fashion with control current of the opposite polarity as would be expected. It is also interesting to note that, even in the inverter configuration shown in FIGURE 1 in which the frequency-determining magnetic element is the main power transformer and handles the entire power output of the inverter, a relatively low control circuit power may be used to control the frequency of an inverter which handles a significantly larger amount of power. For example, in the FIGURE 1 circuit with the component values previously stated, a control circuit power of 0.17 watt was sufficient to cause a 100:1 frequency change at an output power level of 2.7 watts. Actually, where frequency control of a high-power inverter is desired, an inverter configuration in which the saturable-core frequency-determining element is not the main power-handling transformer and only handles the transistor base-drive power has significant advantages. One such circuit is described by Jensen in Reference 6 which may be referred to for details of such a circuit. To obtain frequency control in this circuit, and in the many other configurations of switching-transistor inverters in which a saturable core is the frequency-determining element, it is generally only necessary to substitute for the frequency-determining core two stacked cores containing control windings in the manner shown in FIGURE 1.

Figure 2:
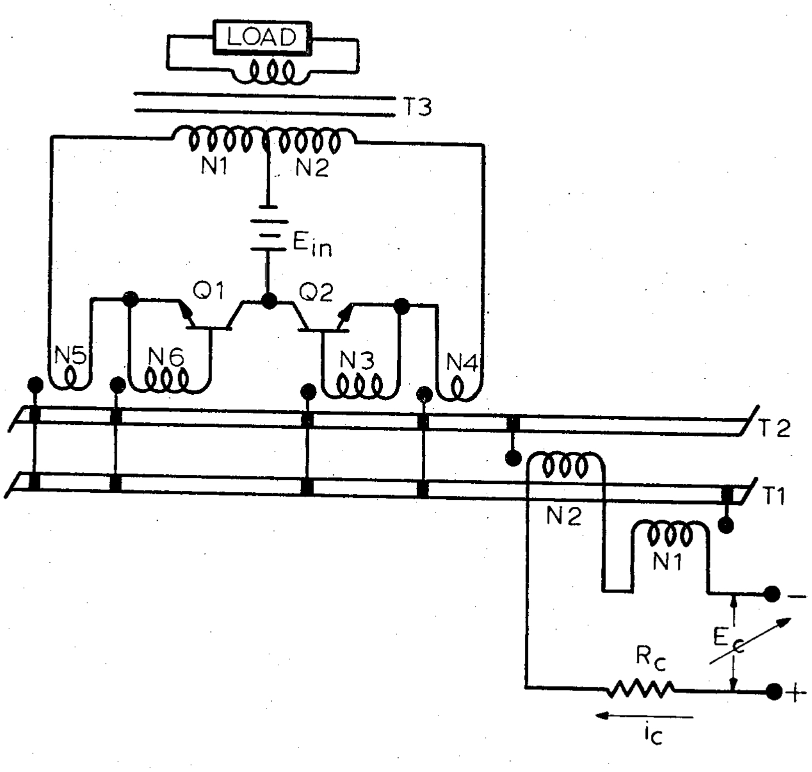
FIGURE 2 shows the invention circuitry applied to a magnetically-coupled multivibrator with current feedback.

The general adaptability of the invention to a variety of types of magnetically-coupled multivibrators is illustrated by its application to a current-feedback type inverter such as shown in FIGURE 2. In this type of circuit, the frequency-determining magnetic element handles only the transistor base-drive power rather than the entire output power of the inverter. An explanation of such a circuit is to be found in previously referred to Reference 3.

Figure 4:
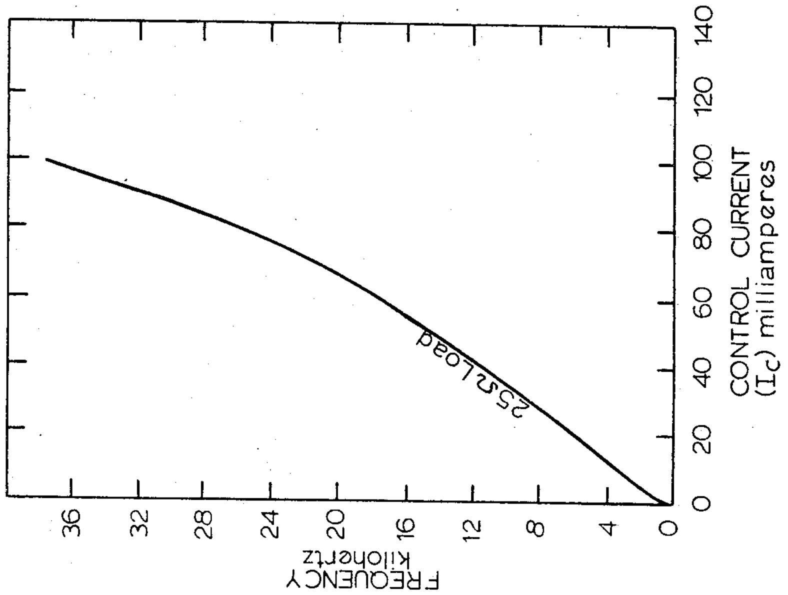
FIGURE 4 shows a plot of frequency versus control current for the circuit of FIGURE 2.

FIGURE 4 shows the frequency-control characteristic of a circuit embodying the current-feedback inverter of FIGURE 2 and using the following component values:

$T_1$, $T_2$—
Core—52143–2D Magnetics, Inc., Butler, Pa.
$N_1$, $N_2$—100 turns #34 AWG.
$N_3$, $N_6$—145 turns #34 AWG.
$N_4$, $N_5$—14 turns #24 AWG.
$T_3$—
Core—50001–2K Magnetics, Inc., Butler, Pa.
$N_1$, $N_2$—120 turns #24 AWG.
$N_L$—60 turns #20 AWG.
$R_c$—4.2 ohms (3.2 ohms winding resistance, 1 ohm external).
$Q_1$, $Q_2$—2N3053.
$E_{in}$—15 volts DC.

Although the frequency-controlled voltage-feedback inverter such as shown in FIGURE 1 may have advantages in such applications as telemetry because of its linearity, the current-feedback type of inverter such as shown in FIGURE 2 often has many advantages, such as better efficiency and more ruggedness, for power-handling applications such as motor-speed control. For the FIGURE 2 circuit using the component values stated above, it is also interesting to note that a control circuit power of only .0225 watt was required to cause a 100:1 change in frequency at an output power level of 2.25 watts. This is a control-power to output-power ratio of 1:100 as compared to a similar ratio of only 1:16 for the circuit of FIGURE 1 for the same ratio of frequency change. As mentioned previously, this is to be expected since the frequency-determining element in the circuit of FIGURE 2 handles only the base-drive power for the transistors rather than the full output power of the inverter.

In a frequency-controlled oscillator of the invention, the control-circuit current pulses are always very short in duration since they cause switching to occur and end as soon as switching does occur. Their amplitude depends strongly on the electrical characteristics of the transistors of the inverter and, because the two transistors will have somewhat differing characteristics through normal manufacturing tolerances, the amplitudes and volt-second content of the two control-circuit pulses occurring during a full cycle of oscillation will sometimes exhibit noticeable differences. As with the response of series-connected magnetic amplifiers, the change in frequency of an oscillator which is produced according to the invention by a change in control current is not instantaneous. Following a change in control current, a new steady-state frequency is reached after a transient interval of changing frequency. As is the case with the magnetic amplifier, the length of this transient interval, or the time constant associated with the change, is strongly dependent upon the magnitude of the control circuit resistance $R_c$. For a given number of control turns, decreasing the control circuit resistance $R_c$ causes the oscillator to display a longer frequency-change time constant but enables the frequency to be controlled with less control power.

It should also be noted that the single control circuit shown in FIGURE 1 and that shown in FIGURE 2 can be replaced by two or more independent control circuits encircling the same two magnetic paths. In this event, as in the case of series-connected magnetic amplifiers, the effect of signals in the multiple control circuits will be additive. For example, if two such control circuits were used, a positive signal may be applied to one such control circuit so as to raise the frequency to some intermediate value in the absence of any signal being applied to the second control circuit. Then a positive signal in the second control circuit will cause a further increase in frequency, whereas a negative signal in this second control circuit will be found to cause a decrease in frequency since it will tend to offset some of the positive "bias" being applied by the first control circuit.

In summary, the frequency-control of the invention may readily be applied to almost any of the multitude of switching-transistor saturable-core inverters in which a cyclically saturating square-loop core is the frequency-determining element. With presently available transistors and magnetic components, frequency-control according to the invention is readily applicable in circuits ranging in power level from milliwatts to tens of kilowatts and in frequency level from a few cycles per second to hundreds of kilocycles per second. A primary area of usefulness for these techniques is that of power conditioning, involving applications such as motor-speed control, power regulation, frequency control and regulation, variable-frequency drivers for higher-power output circuits and the like. Another broad area of usefulness is that of telemetry and other information transmission and encoding applications. A primary advantage of frequency-control according to the invention is that it may easily be incorporated into most of the well known types of saturable-core inverters which are in widespread use today without seriously compromising one of the main characteristics of these inverters and which has led to such widespread use, namely, their physical simplicity.

Having described the invention, what is claimed is:

1. A magnetically coupled oscillator circuit including, in combination:

(a) magnetic means comprising first and second stacked square loop cores establishing first and second saturable magnetic paths of substantially the same selected saturable characteristic;

(b) switching means including a first source of D.C. drive voltage, a pair of switching elements and a first winding configuration having plural winding elements each encircling both said paths, said drive voltage, switching elements and first winding configuration elements being arranged such that cyclical magnetomotive forces are developed and applied to both said paths and said cores are cyclically driven toward opposed saturation levels, and an alternating voltage developed having a base frequency proportional to the rate of said cyclical driving;

(c) a control winding configuration including a first winding encircling only said first path and a second winding encircling only said second path, said first and second windings being connected with opposite polarity and in series; and (d) a second independent source of D.C. voltage having a predetermined value and being applied in series with said control winding configuration whereby when in excess of zero volts to cause a direct control current to flow in said control winding configuration;

said control winding configuration and second source of control voltage being operatively effective such that on one-half cycle of operation of said switching means the magnetomotive force produced by the said direct control current adds to the magnetomotive force being applied to said first path by said switching means and subtracts from the magnetomotive force being applied to said second path by said switching means whereby to drive said first path to saturation ahead of said second path and by saturation of said first path to alter the state of said switching means so as to cause the direction of movement of flux in both said first and second paths to reverse prior to said second path reaching saturation and such that on the next half-cycle of operation of said switching means the magnetomotive force produced by said direct control current subtracts from the magnetomotive force being applied to said first path by said switching means and adds to the net magnetomotive force being applied to said second path by said switching means whereby to drive said second path to saturation ahead of said first path and to cause the flux in both said first and second paths to reverse prior to said first path reaching saturation, continuous driving of only said first path to saturation in one direction on one-half cycle and driving only said second path to saturation in the opposite direction on the next half-cycle being effective to cause said alternating voltage to be developed at a second altered frequency, the difference in frequency between the said base frequency and the said second altered frequency being determined by said control winding configuration and the magnitude of said control voltage.

2. In an oscillator circuit as claimed in claim 1 wherein said second source of D.C. control voltage constitutes a variable D.C. control voltage, said oscillator thereby being enabled to operate at various frequencies corresponding to set voltage values of said variable control voltage.

References Cited

UNITED STATES PATENTS

| | | | |
|---|---|---|---|
| 3,004,226 | 11/1961 | Jensen | 331—113 |
| 3,092,786 | 6/1963 | Bayne | 331—113 |
| 3,237,127 | 2/1966 | Corey | 331—113 |
| 3,263,122 | 7/1966 | Genuit | 331—113 |

JOHN KOMINSKI, *Primary Examiner.*

U.S. Cl. X.R.

321—2; 331—181